No. 704,857. Patented July 15, 1902.
A. CASTELIN.
ROTARY APPARATUS OR PLOW FOR TREATMENT OF GROUND.
(Application filed Jan. 9, 1902.)

(No Model.) 2 Sheets—Sheet 1.

Witnesses:
Philip N. Tilden.
C. D. Kesler.

Inventor
André Castelin
By
James L. Norris
Atty

No. 704,857. Patented July 15, 1902.
A. CASTELIN.
ROTARY APPARATUS OR PLOW FOR TREATMENT OF GROUND.
(Application filed Jan. 9, 1902.)
(No Model.) 2 Sheets—Sheet 2.

Fig. 4.ª

Witnesses:
Philip N. Tilden.
C. D. Kesler.

Inventor
André Castelin
By
James L. Norris
Atty.

UNITED STATES PATENT OFFICE.

ANDRÉ CASTELIN, OF PARIS, FRANCE, ASSIGNOR TO THE SOCIÉTÉ ANONYME D'ETUDES ET D'EXPLOITATION DES BREVETS A. CASTELIN POUR MACHINES AGRICOLES AUTOMOBILES, OF PARIS, FRANCE.

ROTARY APPARATUS OR PLOW FOR TREATMENT OF GROUND.

SPECIFICATION forming part of Letters Patent No. 704,857, dated July 15, 1902.

Application filed January 9, 1902. Serial No. 89,086. (No model.)

*To all whom it may concern:*

Be it known that I, ANDRÉ CASTELIN, engineer, a citizen of the French Republic, residing at Paris, department of Seine, France, (having post-office address 17 Rue St. Florentin, in said city,) have invented certain new and useful Improvements in Rotary Apparatuses or Plows for the Treatment of Ground, of which the following is a specification.

The present invention has for its object improvements in appliances for the treatment of land by means of which machines—such as plows, harrows, hoes, diggers, and the like, to which a simple rotary movement is given—can be replaced by rotary tools operating the attack on the ground in a quite different manner than the above-named machines while having a movement of rotary.

In apparatus according to my present invention the tools are arranged around their axis of rotation. One part of these tools attacks the ground and the other part serves for throwing the material either outside the furrow formed by the tool (in the case of plows, harrows, and the like) or inside the said furrow in the case of hoes, diggers, and the like.

My invention is especially applied to the kind of machines wherein the attack on the ground results from a rotary movement, producing a continuous or discontinuous furrow, for the purpose of turning up the ground, shaking, removing, or hoeing the same, or removing superficial vegetation therefrom.

In order that my invention may be fully understood, I will proceed to describe the same with reference to the accompanying drawings, of which—

Figure 1:
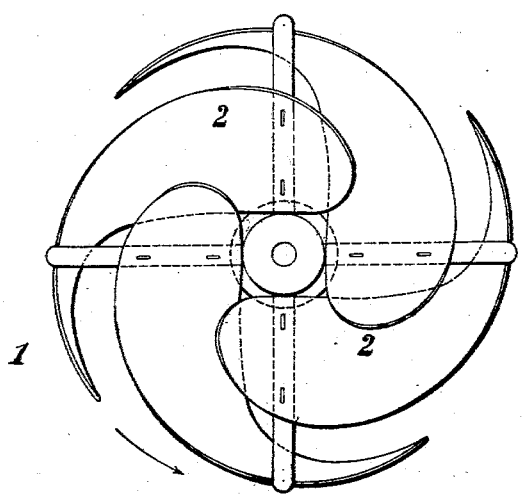
Figure 2:
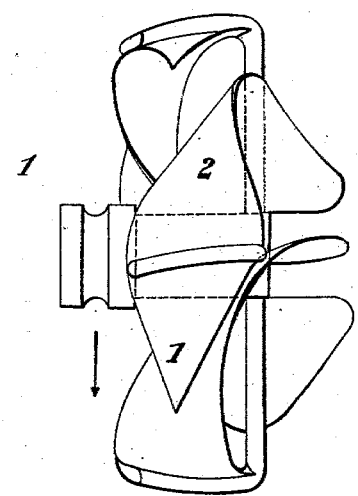
Figure 3:
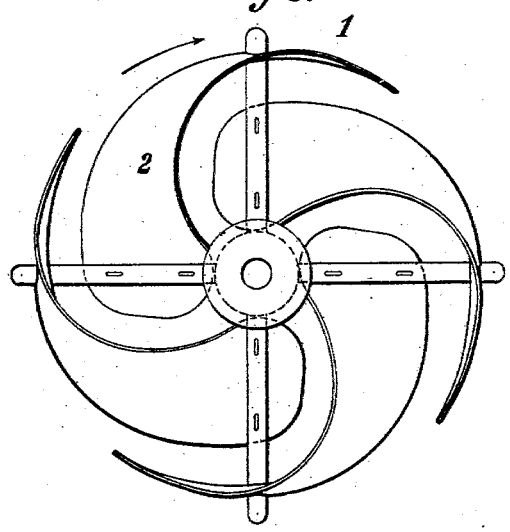
Figure 4:
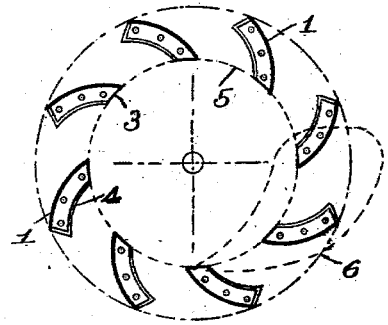
Figure 5:
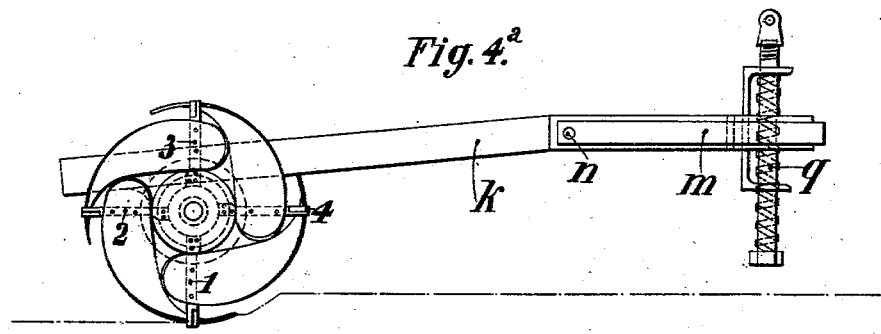
Figure 5:
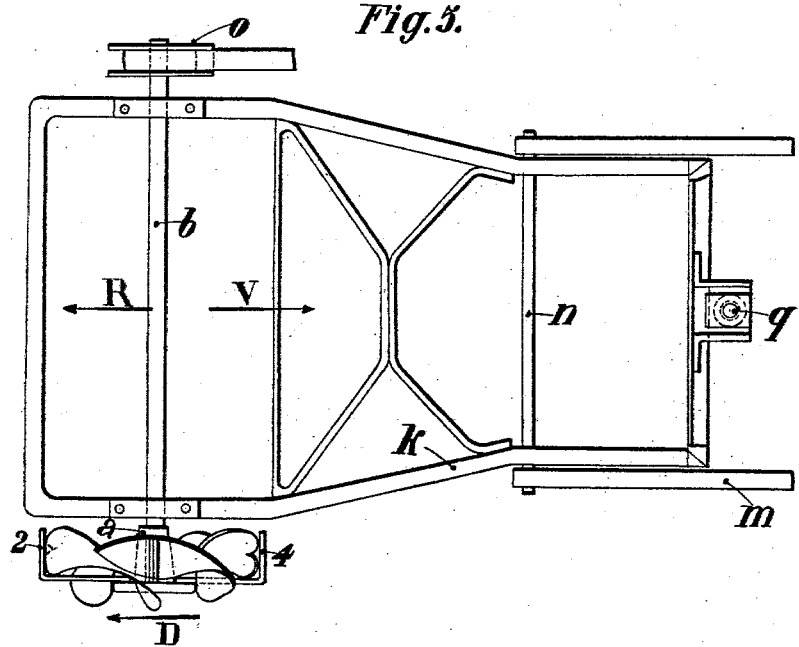

Figure 1 is a side view of a rotary plow according to my invention in a plane parallel to the line along which the ground is to be worked on. Fig. 2 is a rear view of the same, showing the arrangement of the curved blades. Fig. 3 is a view of the opposite side to that of Fig. 1. Fig. 4 shows another arrangement of my rotary plow. Fig. 4ᵃ is a side elevation, on a reduced scale, showing the manner in which the plow is mounted on a plow-frame. Fig. 5 is a plan view of Fig. 4.

Referring to Fig. 1, it is seen that the plow comprises four hoes 1. The hoe 1 attacks the ground and the removed earth is drawn onto the moldboard 2, which turns up the earth in the same conditions as does an ordinary plow and throws it outside the furrow. The sheet-iron blades, which are bent so as to form hoes and moldboards, are attached to the axis by means of iron rods bent at a right angle, the outer edges of which are intended to come into contact with the ground, being beveled. A rotation is given to the plow in the direction of its advancement, as indicated by the arrows.

According to another arrangement (shown in Fig. 4) the hoes are mounted on a metallic hub or disk 3, to which they are fastened by means of angle-irons 4. Near the inner circumference 5 of the said disk is placed a single stationary moldboard 6, to which the earth is fed by the several hoes successively. The moldboard may be placed on the right or the left hand, according to the side on which the furrow is to be formed.

Referring to Figs. 1 to 3, it is seen that the plow comprises four tools formed by sheet-iron blades which are bent so as to form hoes 1, which attack the ground, moldboards 2, which turn up the earth in the same conditions as does an ordinary plow, and parts 3, which extend outward, Fig. 2, and throw the earth outside the furrow. These tools or sheet-iron blades are attached to the hub *a* by means of radial arms 4, formed by iron rods bent at right angles, the edges which are intended to come into contact with the ground, being beveled. A rotation is given to the plow in the direction of the arrow.

When the plow is required to work, it is secured to a frame, as shown, for an example, in Figs. 4ᵃ and 5. The hub *a* of the plow is keyed on a shaft *b*, bearing in a frame *k*, {the said frame being hinged at *n* to the shafts *m*, forming part of a motor-carriage. A spring device, such as *q*, controls the inclination of the frame $k$, and consequently the height of the plow respectively to the ground. On the end of the shaft $b$ opposite to the hub $a$ is keyed a pulley $o$, to which a rotation is given in the direction D from the motor on the carriage. The plow works when the frame $k$ is displaced horizontally as well as in the direction indicated by the arrows V or R, provided that the speed of the rotation in the direction D be suitably controlled.

It must be understood that the rotary apparatus according to the present invention for attacking and working the ground is liable to a great number of applications in agricultural appliances as well as in public works— e.g., excavators—and in the latter case slight modifications only are required concerning the attachment of the rotary tools. The cutting-tools may be more or less distant from the center, they may be varied in number, and their own resistance may be calculated for a given work. The form and rigidity of the supports may also be varied and any suitable material can be employed in their construction and that of the blades without departing from the principle of my present invention.

Having now particularly described and ascertained the nature of my invention and in what manner it may be carried into effect, I declare what I claim is—

1. A rotary plow comprising a hub, radial arms extending therefrom and bent at right angles near their ends, and approximately S-shaped hoes supported by said radial arms.

2. A rotary plow comprising an axle, a hub mounted thereon, radial arms extending from said hub, and bent at a right angle near their ends, and hoes attached to said radial arms and supported intermediate the points by such right-angular bends.

In testimony whereof I have hereunto set my hand in presence of two subscribing witnesses.

ANDRÉ CASTELIN.

Witnesses:
EDWARD P. MACLEAN,
EMILE KLOTZ.